3,175,976
AUTOMATIC TRANSMISSION FLUIDS
Edward G. Foehr, San Rafael, Calif., assignor to California Research Corporation, San Francisco, Calif., a corporation of Delaware
No Drawing. Filed Apr. 16, 1962, Ser. No. 187,942
8 Claims. (Cl. 252—75)

This invention pertains to automatic transmission fluids; in particular, automatic transmission fluids of improved high temperature stability.

This application is a continuation-in-part of patent application Serial No. 808,892, filed April 27, 1959, and which is now abandoned.

Automatic transmission fluids must act as automatic power transmission media, gear and bearing lubricants, heat transfer media, and hydraulic control fluids. The advent of new, higher horsepower engines in passenger cars makes it more difficult for an automatic transmission fluid to perform the above noted function while maintaining maximum resistance to oxidation and freedom from deposit formation. Because of the increased horsepower of today's passenger car engines, automatic transmission fluids, acting as an energy sump, operate at temperatures higher than originally anticipated.

Unless properly compounded, automatic transmission oils oxidize at high operating temperatures and cause malfunction of the transmission units. The transmission oils become sludgy, depositing lacquer on the moving parts of the transmissions. The formation of sludge in the transmission oils results in the plugging by sludge of the numerous ports through which the transmission oils must flow in order to assure proper shifting during the movement of the vehicle. These numerous ports become lacquered; that is, deposits form within the ports, thereby further inhibiting the smooth flow of the oil, severly damaging the many parts necessary to the proper operation of the transmission themselves.

Certain automatic transmissions contain planetary gears which are actuated by vertical metal discs which are known as the "driven discs." Alternating with these driven discs is a set of vertically spaced discs which are known as the "driving discs." These driving discs are consequently rotating when the engine is in operation. One set of discs is faced with a hard fiberlike material of the type found on brake bands (e.g. Krefeld). All of the discs are bathed in the transmission oil.

In the operation of the automatic transmission, the fiber-faced discs and the plain metal discs come into contact with each other to bring about the change in gear ratios for the desired driving speed. As this contact is being made, the fiber-faced discs begin to rotate until they are firmly attached to the metal discs and rotating at the same speed as the metal discs. However, when sludging and lacquer formation occur, a condition is often brought about so that when the fiber-faced discs and the plain metal discs commence to contact one another a phenomenon known as "stick-slip" takes place. This phenomenon is brought about by the fiber composition momentarily grabbing the steel discs then momentarily slipping on the surface of the disc, only to instantaneously grab the steel disc again. Because of this effect, an interrupted motion is transmitted to the passengers in the automobile. Furthermore, because of the improper contact of the discs, complete slippage can occur, resulting in automatic shifting from lower gear ratios to higher gear ratios, causing a sudden speeding up of the engine. Such a speeding up of the engine and the consequential friction caused with the transmission oil itself, increases the temperature of the transmission oil. The resulting high temperature oftentimes causes a condition wherein the disc-facing particles are pulled from the facings and dispersed in the oil. These particles further assist in plugging the ports through which the automatic transmission oil must travel for the proper functioning of the transmission.

Any of the above conditions resulting from an improper automatic transmission oil leads eventually to the complete breakdown of the transmission. That is, the automatic transmission no longer functions as such.

Therefore it is an object of this invention to set forth a new transmission oil which inhibits the formation of sludge in transmission oils, and inhibits the formation of lacquer deposits.

It is a further object of this invention to describe a new automatic transmission oil of high detergency and in which a minimum viscosity change occurs during the operation of the transmission.

In accordance with the present invention, it has been discovered that automatic transmission oils of high utility are obtained by incorporating in a light oil, in combination, a di(tertiarybutyl) phenol, a zinc dithiophosphate, and an alkyl methacrylate-vinyl pyrrolidone copolymer.

As noted hereinabove, automatic transmission oils serve as hydraulic media which transmit power from the automotive engine to the driving wheels. Thus, not only does the transmission oil described herein inhibit the formation of sludge and deposits, but the use thereof results in a minimum loss of transmitted power. This transmission oil permits the proper smooth shifting of the transmissions resulting in the smooth transmission of power during all stages of the operation of the vehicle.

The alkyl methacrylate-vinyl pyrrolidone copolymers which are effective in the compositions of this invention are exemplified by the copolymer herein designated Constituent S, which is further identified as an alkyl methacrylate-vinyl pyrrolidone copolymer having a molecular weight of approximately 300,000 and a nitrogen content of about 1%, and wherein the alkyl radicals are mixed $C_{12}$ and $C_{18}$ alkyl radicals. For the purpose of this invention, such copolymers may have molecular weights from 100,000 to 500,000; and the nitrogen content may vary from 0.5% to about 1.5%. The alkyl methacrylate-vinyl pyrrolidone copolymers function as viscosity improving agents, and they also serve to improve the detergency characteristics in the oil, inhibiting the formation of sludge and lacquer deposits on the metal parts.

The zinc dithiophosphates of this combination of addition agents are zinc dialkyl dithiophosphates wherein the alkyl radicals contain from 4 to 10 carbon atoms; for example, zinc dibutyl dithiophosphate, zinc dihexyl dithiophosphate, zinc dioctyl dithiophosphate, zinc didecyldithiophosphate, zinc n-butyl n-hexyl dithiophosphate, zinc n-butyl, n-amyl dithiophosphate, etc. Of more particular benefit herein are zinc di-n-octyl dithiophosphate and zinc mixed dialkyl dithiophosphates wherein one of the alkyl radicals contains no more than 4 carbon atoms, and the other alkyl radical contains 6 carbon atoms. These latter dithiophosphates are described in Mulvany U.S. Patents Nos. 2,680,123 and 2,689,220.

The di(tertiarybutyl) phenol includes di(tertiarybutyl)-p-cresol; 4,4'-methylene bis(2,6-ditertiary butyl phenol); 4,4'-bis(2,6-ditertiarybutyl phenol); 2-6-di(tertiarybutyl) α - dimethyl amino - p - cresol; and 2,6 - di(tertiarybutyl) phenol.

Base oils used herein for automatic transmission oils include a wide variety of light hydrocarbon oils, such as naphthenic base, paraffin base, and mixed base mineral oils, other hydrocarbon oils, e.g., oils derived from coal, and synthetic oils such as alkylene polymers (such as polymers of propylene, butylene, etc.), mixtures of the above, etc. The base oils have viscosities ranging from 33 SSU at 210° F. to 50 SSU at 210° F. In certain particular instances it may be desirable that the base oil have a viscosity greater than 50 SSU at 210° F. Preferred base oils are those having viscosities of 39 SSU to 45 SSU at 210° F., with a minimum viscosity index of 60. Especially preferred are the base oils having viscosities in the range of 40 to 42 SSU at 210° F., with a viscosity index of about 80 or greater. Thus, the viscosity index is in the range of 60 to 80 or greater.

The additives described hereinabove are used in the transmission oils in amounts as follows: from 2 to 8 millimols (based on the metal) of zinc dialkyl dithiophosphate per kilogram of finished oil (i.e., from 2 to 8 mM./kg.) or by weight percent, from 0.2 to 0%; from 2 to 10% by weight, of Constituent S; and from 0.1% to 0.5% or 1.0%, by weight, of the di(tertiary-butyl) phenol.

The particular combination of addition agents is used in the base oil in certain weight ratios with respect to each other. The weight ratio of constituent S to the phenol ranges from 10:1 to 5:1; and the weight ratio of the Constituent S to the zinc dithiophosphate is from 5:1 to 40:1, with a ratio in the range of 5:1 to 10:1 being especially preferred.

The particular blend of components which has been found to be especially preferred is a blend comprising 4% by weight, of Constituent S, 0.4% by weight of a di(tertiarybutyl) phenol, and 0.4%, by weight (4.7mM./kg. finished oil) of the znic mixed dialkyl dithiophosphate or the zinc di-n-octyl dithiophosphate in a petroleum base oil.

For purposes of ease of transportation, oil concentrates of the above-defined additives may be prepared. The oil concentrates can contain as much as 25 times the amounts set forth hereinabove for the concentration of the additives.

Table I hereinbelow presents data showing the stability of automatic transmission oils encompassed by this invention.

For the purpose of determining the oxidation stability of these automatic transmission fluids, the oils were tested in a modified Allison Type C oxidation test, which is based on Federal Specification VV–L–791d, Amendment 1, Method 530.8.2 (June 20, 1950). This test is described as follows:

The test apparatus consists of a Pyrex glass test tube, 65 mm. O.D. by 500 mm. in length. The test tube is fitted with a Pyrex air tube 6 to 8 mm. in outside diameter and 50 mm. longer than the test tube. The test tube is then immersed in a bath maintained at 350° F.±1° F. The oxidation is carried out in the presence of metal catalysts, which catalysts, in the modified version of the Federal Specification Test used here, were copper and iron. Both metals were in the form of coiled wire 17" long and 25 gauge. Reagent grade iron was used along with pure copper.

The copper and iron wire were polished with 000 Emery polishing paper and cleaned with benzene and acetone. They were weighed to an accuracy of 1 mg. and placed in the test tube, which assembly was then weighed to an accuracy of 0.1 gram. 300 ml. of the test oil was then introduced into the test tube and the tube and oil weighed to an accuracy of 0.1 gram. This assembly was then placed in the bath and heated to a temperature of 350° F., at which time the air tube was introduced into the test tube so that the orifice end of the air tube was in the oil within 1/8" of the bottom of the tube. A stream of air saturated with water at 100° F. was bubbled through the oil at a rate of 8±0.5 liters per hour. The test was normally run for 150 hours, after which time the wires were withdrawn, washed and examined. The oil was examined for gummy substances identified herein as pentane insolubles. The neutralization value (that is, mgs. of KOH necessary to neutralize one gram sample) of the oil was determined before and after the test. The viscosity was determined at 210° F. for the oxidized oil and for the original oil; and the percent change in viscosity was noted.

The base oil of Table I consisted of 80% of a California naphthenic base oil having a viscosity of about 38 at 210° F., and 20% of a California paraffinic base oil having a viscosity of 42.5 SSU at 210° F.

Viscosity Index improver D was a polyvinyl alkyl ether having a molecular weight of about 100,000.

The zinc dithiophosphate was a zinc mixed dialkyl dithiophosphate wherein one of the alkyl radicals contained 4 carbon atoms and the other alkyl radical contained 6 carbon atoms.

TABLE I

| Additives | Example Nos. | | | | | |
|---|---|---|---|---|---|---|
| | 1 | 2 | 3 | 4 | 5 | 6 |
| Di-tert-butyl-p-cresol, percent | 0.4 | 0.4 | 0.4 | 0.4 | 0.4 | 0.4 |
| Zn Dithiophosphate, mM./kg | 4.7 | 4.7 | 4.7 | 0.0 | 0.0 | 9.4 |
| Quinizarin, percent | 0.01 | 0.0 | 0.01 | 0.01 | 0.00 | 0.01 |
| Pentaerythritol Monooleate, percent [1] | 0.5 | 0.5 | 0.5 | 0.5 | 0.5 | 0.5 |
| Constituent S, percent | 4.0 | 4.0 | 4.0 | 4.0 | 4.0 | 4.0 |
| Silicone Foam Inhibitor, percent | 0.001 | 0.001 | 0.001 | 0.001 | 0.001 | 0.001 |
| Viscosity Index Improver D, percent | | | | | | |
| Didodecyl Selenide [2] | | | 0.2 | | | |
| Oil Characterization: | | | | | | |
| Viscosity Increase at 210° F., percent | 35 | 48 | 40 | 77 | 144 | 70. |
| Acid Number Increase | 4.1 | 4.5 | 6.8 | 10.0 | 9.4 | 8.0. |
| Pentane Insoluble, percent | 0.02 | 0.02 | 0.04 | 4.0 | 4.2 | 0.34. |
| Lacquer (rod) | None | None | None | None | None | None. |
| Sludge (tube) | do | do | One spot | One spot | do | Several spots. |
| Copper | Black, firm | Black, firm | Black, firm | Tan | Tan | Black, loose. |
| Steel | Slight tarnish | Slight tarnish | Slight tarnish | Slight tarnish | Slight tarnish | Slight tarnish. |
| Interpretation of Oil Performance | Excellent | Excellent | Excellent | Poor | Poor | Good. |

[1] Anti-squawking agent.  [2] Oxidation Inhibitor.

The data of Table I herein above clearly show the critically of the particular combination of additives for transmission oils. Viscosity index improving agents other than the described alkyl methacrylate-vinyl prrolidone copolymers are ineffective for the purpose of this invention.

Further data showing the effectiveness of the automatic transmission oils of this invention are set forth in Tables II and III hereinbelow.

in the molal ratio of monomers was 35:1. The alkyl methacrylate had alkyl groups containing from 12 to 18 carbons. The polyglycol was polyethylene glycol mono lauryl ether having a molecular weight of about 1700.

V.I. improving agent B was a copolymer of a mixed alkyl methacrylate, and polyglycol methacrylate wherein the molal ratio of monomer was 60:1.

V.I. improving agent C was a copolymer of a mixed alkyl methacrylate, and polyglycol methacrylate wherein the molal ratio of monomer was 100:1.

TABLE II

| Additives | 7 | 8 | 9 | 10 | 11 | 12 | 13 |
|---|---|---|---|---|---|---|---|
| Di-tert-butyl-p-cresol, percent | 0.4 | 0.4 | 0.4 | 0.4 | 0.4 | 0.4 | 0.4. |
| Zinc Dithiophosphate, mM./kg | 4.7 | 0.0 | 0.0 | 4.7 | 4.7 | 4.7 | 4.7. |
| Quinizarin, percent | 0.01 | 0.01 | 0.01 | 0.01 | 0.01 | 0.01 | 0.01. |
| Pentaerythritol Monooleate, percent.[1] | 0.5 | 0.5 | 0.5 | 0.5 | 0.5 | 0.0 | 0.0. |
| Constituent S, percent | 4.0 | 4.0 | 4.0 | 2.0 | 1.0 | 0.0 | 0.0. |
| Silicone Foam Inhibitor, percent | 0.001 | 0.001 | 0.001 | 0.001 | 0.001 | 0.001 | 0.001. |
| Lead Dithiophosphate, mM./kg | | 4.7 | 9.4 | | | | |
| Viscosity Index Improver D, percent | | | | 4.5 | 3.2 | | 4.5 |
| Acryloid 710, percent | | | | | | 5.0 | |
| An Amide Type Detergent, percent | | | | | | 2.0 | 2.0 |
| Oil Characterization: | | | | | | | |
| Viscosity Increase at 210° F., percent | 35 | 86 | 67 | 313 | 8,060 | 142 | 77. |
| Acid Number Increase | 4.1 | 8.2 | 7.1 | 8.8 | 10 | 9.2 | 12.6. |
| Pentane Insoluble, percent | 0.02 | 0.73 | 1.20 | 1.15 | High | 4.9 | 11.3. |
| Lacquer (rod) | None | Trace | Trace | None | Heavy | Heavy | Light. |
| Sludge (tube) | do | One spot | None | do | do | do | Heavy. |
| Copper | Black, firm | Black, firm | Black | Black, loose | Black, sludge | Black, loose | Black, loose. |
| Steel | Slight tarnish | Slight tarnish | Slight tarnish | Slight tarnish | do | Black | Black. |
| Interpretation of Oil Performance. | Excellent | Good | Fair | Poor | Poor | Poor | Poor. |

[1] Anti-squawking agent.

TABLE III

| Additives | 14[1] | 15[1] | 16[1] | 17 | 18 | 19 | 20 |
|---|---|---|---|---|---|---|---|
| Base Oil | (2) | (2) | (2) | (1) | (1) | (1) | (1). |
| Di-tert-butyl-p-cresol, percent | 0.4 | 0.4 | 0.4 | 0.4 | 0.4 | 0.4 | 0.4 |
| Zinc Dithiophosphate, mM./kg | 4.7 | 4.7 | 4.7 | 4.7 | 4.7 | 4.7 | 4.7 |
| Quinizarin, percent | 0.01 | 0.01 | 0.01 | 0.01 | 0.01 | 0.01 | 0.01 |
| Pentaerythritol Monooleate, percent. | 0.5 | 0.5 | 0.5 | 0.5 | 0.5 | 0.5 | 0.5 |
| Constituent S, percent | 4.0 | 0.0 | 0.0 | 0.0 | 0.0 | 0.0 | 0.0. |
| Silicone Foam Inhibitor, percent | 0.001 | 0.001 | 0.001 | 0.001 | 0.001 | 0.001 | 0.001 |
| V.I. Improving Agent A, percent | | 3.5 | | | 4.0 | | 1.0 |
| V.I. Improving Agent B, percent | | | 3.5 | | | | |
| V.I. Improving Agent C, percent | | | | 4.0 | | 1.0 | |
| Oil Characterization: | | | | | | | |
| Viscosity Increase at 210° F., percent | 11 | 10.5 | 1.3 | 54 | 44 | 29 | 26. |
| Acid Number Increase | 2.0 | 1.3 | 1.0 | 5.4 | 6.2 | 7.5 | 5.1. |
| Pentane Insoluble, percent | 0.43 | | | | | | |
| Lacquer (rod) | None | Brown | Heavy brown | Heavy | Heavy | Heavy | Medium heavy. |
| Sludge (tube) | do | Heavy | Heavy | do | do | do | Heavy. |
| Copper | Brown, firm | Brown | Black | Brown | Dark brown | Dark brown | Brown. |
| Steel | Clean | Tarnish | Tarnish | Black | Black | Black | Black. |
| Interpretation of Oil Performance. | Excellent | Poor | Poor | Poor | Poor | Poor | Poor. |

[1] Tests run at 300° F.

Base oil (1) of Table III was the same base oil described hereinabove for Table I.

Base oil (2) was a solvent refined Mid-Continent neutral petroleum oil having a viscosity of 42.1 SSU at 210° F. and a viscosity index of 100.

The zinc dithiophosphate was the same as described hereinabove for Table I.

The lead dithiophosphate was a lead mixed dialkyl dithiophosphate wherein one of the alkyl radicals contained 6 carbon atoms and the other alkyl radical contained 10 carbon atoms.

V.I. improving agent A was a copolymer of a mixed alkyl methacrylate, and polyglycol methacrylate where- Table IV hereinbelow presents data showing the sliding friction properties of compositions of this invention. These data were obtained by taking a piece of a commercial clutch plate facing (a cork composition or a compressed composition paper) and testing it under the temperature and velocity conditions in a low load friction apparatus. The apparatus consisted of a rotating steel disk of the type found in automatic transmissions. The fluid tested surrounded the disk, while the clutch-facing material was held against the disk under a constant load. This test method was similar, with minor variation, to the method described by M. M. Haviland et al., "Lubrication Engineering," vol. 17, No. 3, March 1961. As hereinafter disclosed, the test results correlate with results obtained in standard test transmissions under actual driving conditions.

Experience has shown that in an acceptable fluid, the coefficient of friction must decrease as the rubbing speed decreases at any given temperature. The coefficient of friction was determined at the velocity and temperature conditions set forth in the table. The coefficient of friction should not exceed about 0.18 at low rubbing speeds or grabbing and "squawk" will occur. At the same time the coefficient of friction should be greater than about 0.06 or slipping and "flare" will occur. It was found that the zinc-di-n-octyl-dithiophosphate had coefficients of friction above 0.06. The coefficients of friction were also below 0.18. The designation "f.p.m." signifies "feet per minute."

The fluids with the additive have been compared with a hydrocarbon oil which is a mixed base stock having about 20% of solvent refined paraffinic oil of western origin, having a V.I. (Viscosity Index) of 92 and a viscosity of 150 SSU at 100° F., and 80% solvent refined and acid-treated oil of western origin having a V.I. of about 50 and a viscosity of 80 SSU at 100° F., and containing no additives.

In the exemplification of compositions according to the invention, three base oils were used in preparing the blended base fluids. Base oil A was a blend of California paraffinic and naphthenic oils having a viscosity at 100° F. of 107.6 SSU and a viscosity at 210° F. of 39.7 SSU. Base oil B was a blend of Mid-Continent paraffinic and California naphthenic oils having a viscosity at 100° F. of 109.0 SSU and a viscosity at 210° F. of 39.8 SSU. Base oil C was a blend of California paraffinic and naphthenic oils having a viscosity at 100° F. of 94.0 SSU and a viscosity at 210° F. of 39.0 SSU.

The several additives are identified as follows:

Constituent U was an oil-soluble pour point reducing agent which consisted of a mixture of: (1) condensate of chlorinated paraffin wax and naphthalene having a molecular weight of 1500–3000, and (2) polymerized alkyl fumarate having 12–14 carbon atoms in the alkyl groups and a molecular weight of about 3000–8000. The ratio of the two components of the mixture is 1:1.

Constituent T was an oil-soluble viscosity index improving agent which was a polyisobutylene having a molecular weight of about 220,000.

Constituent K was an oil-soluble basic, acid-neutralizing detergent which was a basic calcium petroleum sulfonate having a ratio of basic to neutral calcium of about 7.3:1, and a molecular weight of about 400. This additive may be used in amounts of 1.0% to 15%, by weight.

Constituent N was an oil-soluble viscosity index improving agent and detergent which was a reaction product of N-methylpiperazine with quadripolymer comprised of monomeric constituents of dodecyl methacrylate, octadecyl methacrylate, polyethylene glycol methacrylate and glycidyl methacrylate in a molar ratio of about 33/17/1/1, wherein the polyethylene glycol has a molecular weight from 500 to 2500, and the molecular weight of the polymer is from 100,000 to 300,000. This additive may be used in amounts of 1.0% to 15%, by weight.

The following listed compositions describe the finished automatic transmission fluids on which the data of Table IV was obtained.

FLUID OF EXAMPLE NO. 47

Base oil A containing: Percent
- Constituent S _____ 4.0
- Constituent T _____ 2.5
- Di-tert-butyl-p-cresol _____ 0.4
- Silicone foam inhibitor _____ 0.1
- Zn-di-n-octyl dithiophosphate _____ 1.0

FLUID OF EXAMPLE NO. 52B

Base oil A containing: Percent
- Constituent S _____ 4.0
- Constituent T _____ 2.5
- Di-tert-butyl-p-cresol _____ 0.4
- Silicone foam inhibitor _____ 0.1
- Zn-di-isodecyl dithiophosphate _____ 1.5

FLUID OF EXAMPLE NO. 55C

Base oil A containing:
- Constituent S _____ 4.0
- Constituent T _____ 2.5
- Di-tert-butyl-p-cresol _____ 0.4
- Silicone foam inhibitor _____ 0.1
- Zn-di-n-octyl dithiophosphate _____ 1.5

FLUID OF EXAMPLE NO. 59

Base oil A containing:
- Constituent S _____ 4.0
- Constituent T _____ 2.5
- Di-tert-butyl-p-cresol _____ 0.4
- Silicone foam inhibitor _____ 0.1
- Zn-di-n-octyl dithiophosphate _____ 1.0

FLUID OF EXAMPLE NO. 60

Base oil A containing:
- Constituent S _____ 4.0
- Di-tert-butyl-p-cresol _____ 0.4
- Constituent T _____ 2.5
- Silicone foam inhibitor _____ 0.1
- Constituent K _____ 0.5
- Zn-di-n-octyl dithiophosphate _____ 0.5

FLUID OF EXAMPLE NO. 61C

Base oil B containing:
- Constituent N _____ 2.0
- Constituent K _____ 0.5
- Constituent T _____ 4.75
- Constituent U _____ 0.2
- Di-tert-butyl-p-cresol _____ 0.4
- Silicone foam inhibitor _____ 0.1
- Zn-di-n-octyl dithiophosphate _____ 0.5

FLUID OF EXAMPLE NO. 63C

Base oil A containing _____ 99.50
Zn-di-n-octyl-dithiophosphate _____ 0.50

FLUID OF EXAMPLE NO. 52 (2)

Base oil A containing:
- Constituent S _____ 4.0
- Constituent T _____ 2.5
- Di-tert-butyl-p-cresol _____ 0.4
- Silicone foam inhibitor _____ 0.1
- Zn-di-isodecyl dithiophosphate _____ 1.5

FLUID OF EXAMPLE NO. 68B

Base oil C containing:
- Constituent S _____ 3.0
- Paratone N _____ 4.2
- Constituent K _____ 0.5
- Di-tert-butyl-p-cresol _____ 0.4
- Silicone foam inhibitor _____ 0.1
- Zn-di-n-octyl dithiophosphate _____ 0.5

FLUID OF EXAMPLE NO. 10

Base oil B containing:
- Constituent K _____ 4.0
- Constituent T _____ 6.2
- Acryloid 710 _____ 1.0
- Di-tert-butyl-p-cresol _____ 0.3
- Phenyl-α-naphthylamine _____ 0.2
- Constituent U _____ 0.2
- Silicone foam inhibitor _____ 0.1

TABLE IV
Frictional characteristics of zinc dialkyldithiophosphates

| Example | Base Oil | Friction Control Agent | Conc., percent | Temp., °F. | Sliding Coeff. of Friction At— | | | |
|---|---|---|---|---|---|---|---|---|
| | | | | | 0 f.p.m. | 5 f.p.m. | 10 f.p.m. | 15 f.p.m. |
| 47 | A | Zn-diisooctyl dithiophosphate | 1.0 | 75 | .220 | .166 | .152 | .18 |
| | | | | 175 | .160 | .186 | .186 | .17 |
| | | | | 300 | .106 | .155 | .166 | .15 |
| 55B | A | Zn-di-n-octyl dithiophosphate | 1.5 | 75 | .170 | .175 | .175 | .175 |
| | | | | 175 | .100 | .138 | .148 | .156 |
| | | | | 300 | .082 | .108 | .116 | .12 |
| 55C | A | Zn-di-isohexyl-dithiophosphate | 1.5 | 75 | .208 | .188 | .178 | .178 |
| | | | | 175 | .164 | .178 | .182 | .180 |
| | | | | 300 | .092 | .130 | .144 | .152 |
| 59 | A | Zn-di-n-octyl-dithiophosphate | 1.0 | 75 | .172 | .176 | .180 | .180 |
| | | | | 175 | .122 | .144 | .156 | .160 |
| | | | | 300 | .102 | .138 | .142 | .144 |
| 60 | A | do | 0.5 | 75 | .152 | .170 | .175 | .170 |
| | | | | 175 | .120 | .145 | .155 | .168 |
| | | | | 300 | .090 | .120 | .125 | .132 |
| 61C | B | do | 0.5 | 75 | .162 | .160 | .160 | .160 |
| | | | | 175 | .122 | .140 | .144 | .146 |
| | | | | 300 | .108 | .116 | .120 | .120 |
| 63C | A | do | 0.5 | 75 | .152 | .160 | .160 | .162 |
| | | | | 175 | .138 | .148 | .152 | .158 |
| | | | | 300 | .120 | .124 | .128 | .130 |
| 52 (2) | A | Zn-di-isodecyl-dithiophosphate | 1.5 | 75 | .232 | .204 | .194 | .186 |
| | | | | 175 | .160 | .192 | .192 | .188 |
| | | | | 300 | .102 | .160 | .174 | .180 |
| 68B | C | Zn-di-n-octyl-dithiophosphate | 0.5 | 75 | .162 | .166 | .170 | .170 |
| | | | | 175 | .118 | .140 | .150 | .156 |
| | | | | 300 | .082 | .112 | .118 | .120 |
| 10 | B | None | | 75 | .210 | .178 | .180 | .175 |
| | | | | 176 | .178 | .160 | .160 | .160 |
| | | | | 300 | .164 | .177 | .162 | .159 |
| | Hydrocarbon | do | | 75 | .181 | .178 | .179 | .174 |
| | | | | 176 | .192 | .160 | .160 | .160 |
| | | | | 300 | .230 | .177 | .162 | .158 |

I claim:

1. An automatic transmission fluid consisting essentially of a hydrocarbon oil having a viscosity range from 39 SSU to 50 SSU at 210° F., and a viscosity index in the range of 60 to 80, from 2 to 8 mM./kg. of a zinc mixed dialkyl dithiophosphate wherein one of the alkyl radicals contains no more than 4 carbon atoms, and the other alkyl radical contains 6 carbon atoms, from 2% to 6% by weight of an oil soluble alkyl methacrylate-vinyl pyrrolidone copolymer having a molecular weight from 100,000 to 500,000, and from 0.1% to 0.5% of a 2,6-di(tertiarybutyl)-p-cresol wherein the weight ratio of said pyrrolidone copolymer to said cresol is from 10:1 to 5:1, and the weight ratio of said pyrrolidone copolymer to said dithiophosphate is from 5:1 to 40:1.

2. An automatic transmission fluid consisting essentially of a hydrocarbon oil having a viscosity in the range of 39–50 SSU at 210° F., from 2 to 8 mM./kg. of a zinc dialkyl dithiophosphate wherein said alkyl radicals contain from 4 to 8 carbon atoms, from 2 to 6% by weight of an oil soluble alkyl methacrylate-vinyl pyrrolidone copolymer having a molecular weight of about 100,000 to about 500,000 and a nitrogen content of about 0.5% to about 1.5% by weight, and from 0.1% to 0.5% by weight of a di(tertiarybutyl) phenol wherein the weight ratio of said pyrrolidone copolymer to said phenol is from 10:1 to 5:1, and the weight ratio of said pyrrolidone copolymer to said dithiophosphate is from 5:1 to 40:1.

3. An automatic transmission fluid consisting essentially of a hydrocarbon oil having a viscosity in the range of 39–50 SSU at 210° F., from 2 to 8 mM./kg. of a zinc dialkyl dithiophosphate wherein one of the alkyl radicals contains 4 carbon atoms and the other alkyl radical contains 6 carbon atoms, from 2 to 6% by weight of an oil soluble alkyl methacrylate-vinyl pyrrolidone copolymer having a molecular weight of about 100,000 to about 500,000, and a nitrogen content of about 0.5% to about 1.5% by weight, and from 0.1% to 0.5% by weight of a di(tertiarybutyl) phenol wherein the weight ratio of said pyrrolidone copolymer to said phenol is from 10:1 to 5:1, and the weight ratio of said pyrrolidone copolymer to said dithiophosphate is from 5:1 to 40:1.

4. An automatic transmission fluid consisting essentially of a hydrocarbon oil having a viscosity in the range of 39–50 SSU at 210° F., from 2 to 8 mM./kg. of a zinc dialkyl dithiophosphate wherein one of the alkyl radicals contain 4 carbon atoms and the other alkyl radical contains 6 carbon atoms, from 2 to 6% by weight of an oil soluble alkyl methacrylate-vinyl pyrrolidone copolymer having a molecular weight of about 300,000 and a nitrogen content of about 0.5% to about 1.5% by weight, and from 0.1% to 0.5% by weight of a di(tertiarybutyl) phenol wherein the weight ratio of said pyrrolidone copolymer of said phenol is from 10:1 to 5:1, and the weight ratio of said pyrrolidone copolymer to said dithiophosphate is from 5:1 to 40:1.

5. An automatic transmission fluid consisting essentially of a hydrocarbon oil having a viscosity in the range of 39–50 SSU at 210° F., from 2 to 8 mM./kg. of a zinc dialkyl dithiophosphate wherein one of the alkyl radicals contains 4 carbon atoms and the other alkyl radical contains 6 carbon atoms, from 2 to 6% by weight of an oil soluble alkyl methacrylate-vinyl pyrrolidone copolymer having a molecular weight of about 300,000 and a nitrogen content of about 1% by weight, and from 0.1% to 0.5% by weight of a di(tertiarybutyl) phenol, wherein the weight ratio of said pyrrolidone copolymer to said phenol is from 10:1 to 5:1, and the weight ratio of said pyrrolidone copolymer to said dithiophosphate is from 5:1 to 10:1.

6. An automatic transmission fluid consisting essentially of a hydrocarbon oil having a viscosity in the range of 39–50 SSU at 210° F., from 2 to 8 mM./kg., of a zinc dialkyl dithiophosphate wherein the alkyl radicals each contain from 4 to 10 carbon atoms, from 2 to 6% by weight of an oil-soluble copolymer of alkyl methacrylate and vinyl pyrrolidone having a molecular weight from about 100,000 to about 500,000, from 1.0 to 15.0% by weight of calcium petroleum sulfonate, from 0.1 to 1% by weight of a di-(tertiary butyl) phenol and from 0.001 to 0.1% by weight of a silicone foam inhibitor, wherein the weight ratio of said pyrrolidone copolymer to said phenol is from 10:1 to 5:1 and wherein the weight ratio of said pyrrolidone copolymer to said dithiophosphate is from 5:1 to 40:1.

7. The fluid of claim 6 wherein the dithiophosphate is zinc di-n-octyl-dithiophosphate.

8. The fluid of claim 7, which contains in addition from 1.0 to 15.0% by weight of the oil-soluble reaction product of N-methyl piperazine with a quadripolymer comprised of monomeric constituents of dodecyl methacrylate, octadecyl methacrylate, polyethylene glycol methacrylate and glycidyl methacrylate in a molecular ratio of about 37/17/1/1, wherein the polyethylene glycol has a molecular weight of about 500 to 2500 and the molecular weight of the polymer is from 100,000 to 300,000.

References Cited in the file of this patent

UNITED STATES PATENTS

| | | |
|---|---|---|
| 2,364,283 | Freuler | Dec. 5, 1944 |
| 2,710,842 | Heisig et al. | June 14, 1955 |
| 2,830,956 | Wasson et al. | Apr. 15, 1958 |
| 2,866,729 | Zimpel | Dec. 30, 1958 |
| 2,883,339 | Richardson | Apr. 21, 1959 |

FOREIGN PATENTS

| | | |
|---|---|---|
| 760,554 | Great Britain | Oct. 31, 1956 |
| 808,665 | Great Britain | Feb. 11, 1959 |

UNITED STATES PATENT OFFICE
CERTIFICATE OF CORRECTION

Patent No. 3,175,976                            March 30, 1965

Edward G. Foehr

It is hereby certified that error appears in the above numbered patent requiring correction and that the said Letters Patent should read as corrected below.

Column 3, line 29, for "0%" read -- 4% --; line 43, for "znic" read -- zinc --; column 5, line 2, for "critically" read -- criticality --; lines 4 and 5, for "prrolidone" read -- pyrrolidone --; column 8, line 4, for "2.5" read -- 2.0 --; column 10, line 43, for "copolymer of" read -- copolymer to --.

Signed and sealed this 24th day of August 1965.

(SEAL)
Attest:

ERNEST W. SWIDER                                  EDWARD J. BRENNER
Attesting Officer                                      Commissioner of Patents